UNITED STATES PATENT OFFICE.

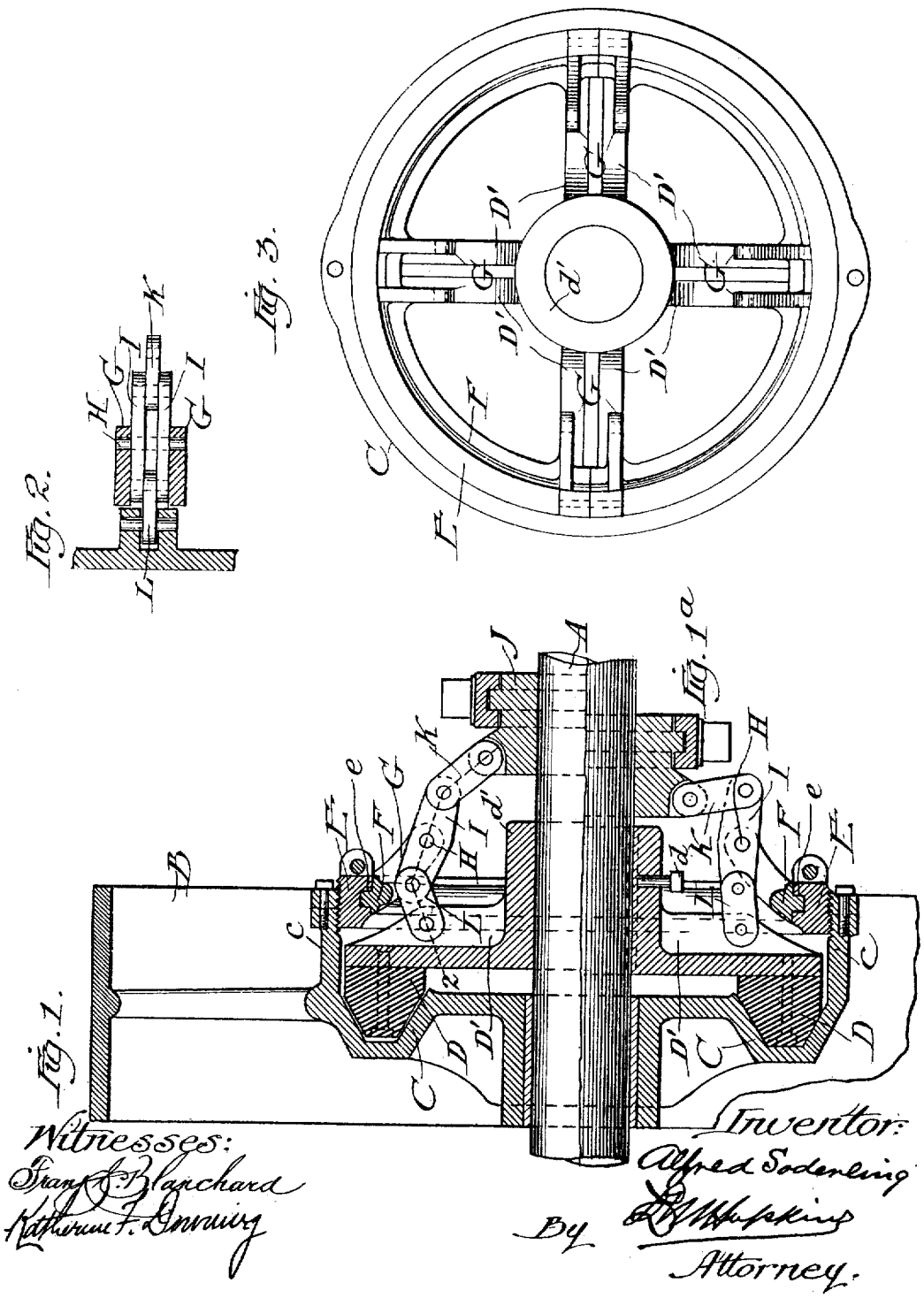

ALFRED SODERLING, OF CHICAGO, ILLINOIS.

FRICTION-CLUTCH.

945,250.  Specification of Letters Patent. Patented Jan. 4, 1910.

Application filed August 11, 1908. Serial No. 447,960½.

*To all whom it may concern:*

Be it known that I, ALFRED SODERLING, a citizen of the United States, residing at Chicago, in the county of Cook and State of Illinois, have invented certain new and useful Improvements in Friction-Clutches, of which the following is a specification.

The present invention is an improvement upon the invention shown and described in Letters Patent No. 887,537 granted to me on the 12th day of May, 1908. This improvement relates in part to the toggle or lever system for transmitting movement from one to the other of the two jaws or members of the clutch and in part to the construction, location and arrangement of two rings having annular shoulders which engage each other and upon which the lever or toggle system operates directly in moving the jaws of the clutch toward and from each other.

The invention consists in the features of novelty that are hereinafter described with reference to the accompanying drawing which is made a part of this specification and in which:

Figures 1 and 1ª are a composite view in axial section of a friction clutch embodying the invention, the upper portion, Fig. 1, showing the parts in the positions which they occupy when the clutch is open, and the lower portion, Fig. 1ª, showing the parts in the positions which they occupy when the clutch is closed. Fig. 2 is a section on the irregular line 2, Fig. 1 showing details in the mechanism for transmitting movement from the shifting collar to the two clutch members for opening and closing the clutch. Fig. 3 is an elevation of the inner face of the clutch with said transmitting mechanism omitted.

The present invention relates to a clutch for coupling and uncoupling two independently revoluble parts, such, for example, as two shafts, or a shaft and a pulley, or two pulleys, one of which is in constant rotation, while the other is allowed to remain at rest when the clutch is open, this general characteristic of all clutches being fully understood by those skilled in the art.

It is to be understood that the specific terms herein used in describing and claiming the invention are to be construed as "terms of description and not terms of limitation" excepting where the contrary clearly appears in the claims.

Referring to the drawing, A represents a shaft and B, a pulley, thereon, which may be considered as the two relatively revoluble parts aforesaid and either of which may be considered as the prime mover, or source of power, but as before intimated this differentiation in no wise concerns the present invention. Relative revolubility and not physical formation is what is to be regarded in construing this application and determining the scope of the invention covered thereby. Interposed between these two relatively revoluble parts is a clutch having two jaws or members, one of which is known as the driving member, which derives its motion directly from the prime mover, while the other is known as the driven member and derives its motion from the driving member through interposed mechanism of suitable construction. It is in the construction and arrangement of the several parts of this transmitting mechanism that the present invention resides. The two relatively revoluble parts carry the jaws or members C and D, respectively, of the clutch. The jaw or member C is loose upon the shaft A, so as to be capable of both rotary and longitudinal movement thereon, while the jaw or member D of the clutch is connected to the shaft so as to be incapable of either sliding or rotating thereon by any suitable means, such, for example, as a screw *d* carried by the sleeve *d'* of the jaw or member D and projecting into a longitudinal groove in the shaft A. The two clutch members, C and D, have complementary engaging surfaces so that when forced together, they will engage each other and the one will compel the other to rotate with it. These engaging friction surfaces may be of any desired character that will afford the necessary frictional contact between them. The jaw C has an annular extension *c* which extends beyond the general plane of the jaw D and is internally threaded for the reception of a ring E made up of a plurality (two) of parts, and this ring E is provided with an annular groove, resulting in two radial shoulders presented in opposite directions with relation to each other and disposed radially with respect to and inwardly toward the shaft. The shoulders provided by this groove correspond in some respects to a radial shoulder which is shown, described and claimed in my former patent above referred to but they differ therefrom in construction, location and arrangement relatively to the other parts, and this difference involves one of the novel features in which the present invention resides. The two shoulders of the ring E are adapted to engage corresponding outwardly presented shoulders on a second ring F and these engaging shoulders on the two rings avoid the necessity for an expansion spring arranged between the two members of the clutch so as to exert a pressure thereon for opening the clutch. Furthermore the threaded engagement of the ring E and the annular extension c of the jaw C enables the adjustment of the ring E relatively to the friction surface of the jaw C, so as to compensate for the wearing away of the friction surfaces of the two jaws. The same expedient, as is shown in my former patent, namely the splitting of the threaded ring E and connecting its two portions by means of a bolt or screw e, is shown in the present application for facilitating the assembling of the parts.

The ring F has formed integrally with it a plurality of pairs of curved arms G, four of such pairs being shown in the drawing, but the number of such arms will depend upon the size and capacity of the clutch. These arms are perforated for the reception of pivots H which form the fulcra of levers I each of which levers constitutes one of the elements of each system of levers, links or toggles for transmitting movement from one to the other of the two jaws of the clutch. As in practically all clutches, there is a collar J mounted upon the shaft A so as to be longitudinally movable thereon, which collar is adapted to be manually operated by mechanism under the control of the operator. The outer end of each of the levers I is jointed to one end of one of the links K, the other ends of which links are jointed to the collar J, so that the longitudinal movement of the collar upon the shaft A will influence both the links K and the levers I. The inner ends of the levers I are jointed to the outer ends of links L, the inner ends of which links are jointed to lugs D' formed on the immovable jaw D. It will be apparent therefore that by moving the collar J toward the jaws of the clutch the links K will be forced outward, and this movement will force the outer ends of the levers I outward and their inner ends inward. This inward movement of the inner ends of the levers I will tend to force inward the inner ends of the links L, and these movements will cause the levers I and the links L to operate as toggles for forcing the jaw C toward the jaw D. This is because of the fact that the inner ends of the links L, are jointed to the immovable member D of the clutch, their outer ends are jointed to the inner ends of the levers I and the levers are fulcrumed to the arms G, which are rigid with the ring F. The ring F is thus carried by the jaw D in the sense that they cannot revolve relatively to each other, while the ring may move relatively to the jaw in a direction which is longitudinal with respect to the axis of the shaft. Operations exactly the reverse of these will take place when the collar J is moved outward—away from the jaws of the clutch.

What I claim as new and desire to secure by Letters Patent is:—

1. In a clutch, the combination of two oppositely movable coöperating jaws having friction surfaces and mechanism for positively moving the jaws toward or from each other, said mechanism including a ring carried by one jaw and having an internal groove providing oppositely presented shoulders, a second ring carried by the other jaw and extending into said groove thus providing shoulders adapted to engage the shoulders first aforesaid, a system of toggles jointed to one of said jaws and to the ring carried by it, and means for operating said toggles.

2. In a clutch, the combination of two oppositely movable coöperating jaws having friction surfaces and mechanism for positively moving the jaws toward or from each other, said mechanism including a ring carried by one jaw and adjustable relatively to the friction surface thereof, said ring having an internal groove, a second ring extending into said groove, a system of toggles jointed to one of said jaws and to the ring carried by it, and means for operating the toggles.

3. In a clutch, the combination of two oppositely movable coöperating jaws, and mechanism for positively moving the jaws toward or from each other, said mechanism including a ring carried by one jaw and having an internal groove, a second ring carried by the other jaw and extending into said groove, arms carried by the second ring, levers fulcrumed at intermediate points to said arms, links each jointed at one end to the inner end of one of said levers and at the other end to the jaw carrying the second ring, links each jointed at one end to the outer end of one of said levers, and a slidable collar to which the other ends of said links are jointed.

ALFRED SODERLING.

Witnesses:
L. M. HOPKINS,
NELLIE ROACH.